May 17, 1960  M. L. WITTE  2,936,963
LEADER SPOOL
Filed Jan. 10, 1958
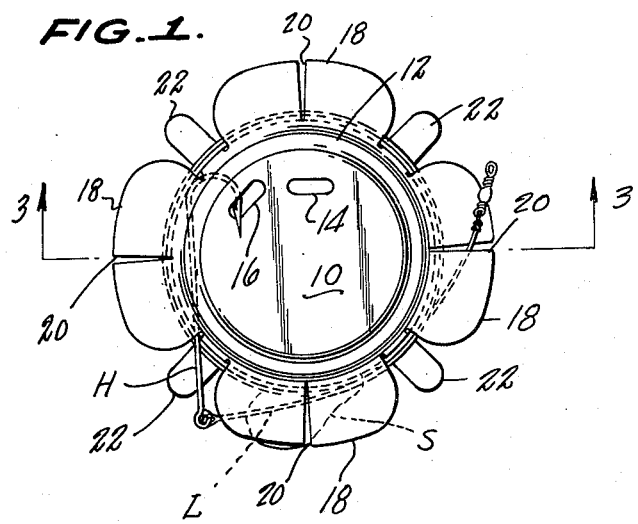
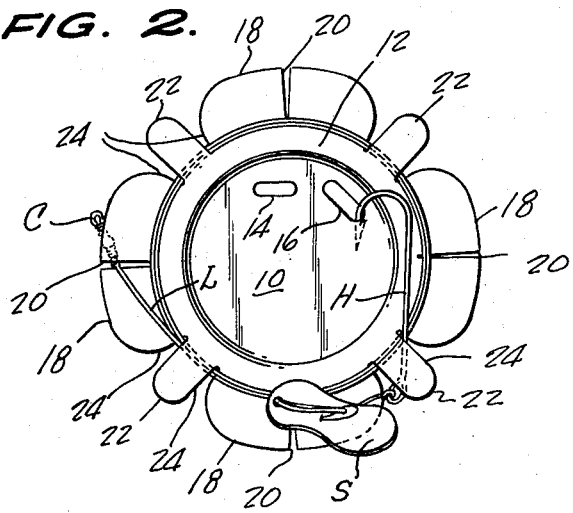
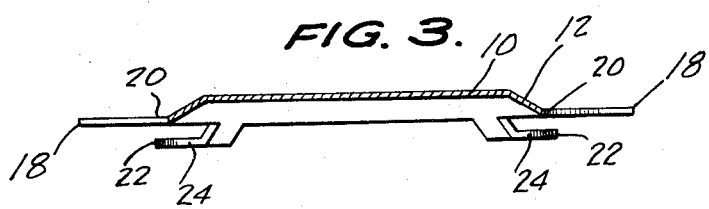
INVENTOR
Melvin L. Witte
BY
McMorrow, Berman + Davidson
ATTORNEYS

United States Patent Office 2,936,963
Patented May 17, 1960

2,936,963

LEADER SPOOL

Melvin Louis Witte, St. Paul, Minn.

Application January 10, 1958, Serial No. 708,225

3 Claims. (Cl. 242—85.1)

This invention relates to devices for holding fishing leaders, and more particularly has reference to a spool-like device, particularly designed for holding one or more leaders in a neatly coiled arrangement, and further adapted for manufacture at a low cost.

The main object of the present invention is to provide a generally improved fishing line leader holder, which will be so designed as to be of a particularly flattened construction, whereby to permit a plurality of leaders to be stored in a very small space in a tackle box or equivalent holder of fishing equipment.

Another object is to so form the spool as to permit a plurality of identical spools to be nested one upon another, in a neat stack that will still further facilitate storage of the several leaders in a small space.

Another object is to so form the spool that when a leader is coiled thereabout, it will be securely held in a neat, flat series of coils, without possibility of entanglement of any portion of the leader with any other portion thereof, or with adjacent leaders.

Another object is to provide a spool for fishing line leaders that can be stamped out of a single, cheap piece of material, such as a relatively thin sheet of sheet metal.

Another object is to provide a leader holder as described that will be adapted to be manufactured from sheet material in such a way as to produce a plurality of ears spaced about the periphery of the leader in such positions, relative to other ears intervening between the first ears, as to define angularly spaced, radially extending slits through which the leader may be threaded while being coiled in position.

Another object is to so form the several ears as to have some of the ears in a first plane and other ears in a second plane, so as to maintain the coils flat even though the coils are securely held at a plurality of locations about their circumferences.

Still another object is to so form the leader spool as to provide an inexpensive device that can even be distributed free, with advertising displays thereon.

Other objects will appear from the following description, the claims appended thereto and from the annexed drawing, in which like reference characters designate like parts throughout the several views and wherein:

Figure 1 is a bottom plan view of a leader spool according to the present invention;

Figure 2 is a top plan view thereof; and

Figure 3 is a sectional view therethrough substantially on line 3—3 of Figure 1.

Referring to the drawing in detail, the leader spool constituting the present invention includes a flat, circular body portion 10 integral at its periphery with a relatively narrow, frusto-conical flange 12. Formed in the body portion, inwardly a short distance from the flange 12, are slots 14, 16, angularly related to each other.

Integrally formed upon the outer edge of flange 12 is a first series of ears 18. Each of these is of substantial dimensions in the sense of a direction circumferentially of the flange, there being four of the ears 18 with adjacent ends of adjacent ears being spaced closely apart. Medially between the opposite ends of each ear 18, there is formed therein a narrow slit 20 which is of wedge shape, being progressively decreased in width in a direction radially inwardly of the device. Slits 20 are disposed radially of the body portion, and extend fully from the outer to the inner edges of the ears 18, terminating at their inner ends at the outer edge of flange 12.

Alternating with ears 18 circumferentially of the device are narrower, radially extending ears 22. Each of these substantially fills the space between adjacent ears, the flange 22, at opposite sides thereof, defining radial slots 24 in cooperation with the several ears 18 (see Figures 2 and 3). The slots 24 extend fully to the outer edge of flange 12.

As will be noted, all the ears 18 are in a common plane parallel to the plane of body portion 10 (Figure 3), the plane of the ears 18 being offset from that of the body portion 10 through the provision of the frusto-conical flange 12 connecting the same. Further, as shown in Figure 3 all the ears 22 are in a common plane which is parallel with and close to the plane of the ears 18, and which is at a slightly greater distance from the plane of body portion 10 than is the plane of ears 18.

At L there has been designated a conventional fishing line leader, including the usual connecting swivel C at one end. At the other end of the leader there is provided a hook H, adjacent which there may be a spinner S.

The swivel connector C provides an enlargement that cannot pass through a selected one of the slots 20, as shown in Figure 2. Accordingly, the leader is engaged in a selected slot 20 after being coiled about the flange 12. The leader is in close proximity to the outer edge of the flange, and is threaded through the several slots 24, so as to underlie all the ears 22 and overlie the ears 18. By offsetting the ears 22 into a plane different from that of the ears 18, the coils of the leader are kept flat.

Further, the coils do not bunch up, but progress along the frusto-conical surface of the flange 12, as will be readily apparent, in the event a plurality of the leader coils is produced due to the fact that the leader may be of unusual length. In any event, the leader is swiftly and easily coiled about the device, and thereafter, the hook will be held in proper position, in a selected slot 14 or 16, whichever is desired.

It will be apparent that the body portion provides a substantial area for imprinting of a label, advertising material, etc. The device, further, can be manufactured at a very low cost, and can thus be distributed as a complimentary item, by leader manufacturers, fishing tackle suppliers, etc.

The device has the further advantage that a plurality of the devices can be nested one upon another, due to the dished formation apparent from Figure 3. In this way, separately coiled leaders are kept out of contact with each other, while still being stored in a very small area in a fishing tackle box.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor changes in construction that may be permitted within the scope of the appended claims.

What is claimed is:

1. A leader spool comprising a single piece of sheet material that includes a flat, circular body portion, a peripheral frusto-conical flange thereon having a circularly-shaped outer periphery concentric with the body portion, a first series of radial ears extending outwardly from the flange in a common plane offset by the flange from the plane of the body portion, and a second series of ears also extending outwardly from the flange and disposed in a common plane offset slightly from and parallel with the plane of the first series, the ears of the second series alternating circumferentially of the spool with the ears of the first series, juxtaposed ears of the first and second series defining therebetween radial slots the inner ends of which terminate at said outer periphery of the flange.

2. A leader spool comprising a single piece of sheet material that includes a flat, circular body portion, a peripheral frusto-conical flange thereon having a circularly-shaped outer periphery concentric with the body portion and lying in a plane disposed in spaced, parallel relation to that of the body portion, a first series of radial ears extending outwardly from the flange and lying wholly in the plane of said outer periphery, and a second series of ears also extending outwardly from the flange and disposed in a common plane offset slightly from and parallel with the common plane of said outer periphery and said first series, the ears of the second series alternating circumferentially of the spool with the ears of the first series, juxtaposed ears of the first and second series defining therebetween radial slots the inner ends of which terminate at said outer periphery of the flange.

3. A leader spool comprising a single piece of sheet material that includes a flat, circular body portion, a peripheral frusto-conical flange thereon having a circularly-shaped outer periphery concentric with the body portion and lying in a plane disposed in spaced, parallel relation to that of the body portion, a first series of radial ears extending outwardly from the flange and lying wholly in the plane of said outer periphery, and a second series of ears also extending outwardly from the flange and disposed in a plane offset slightly from and parallel with the common plane of said outer periphery and said first series to define between said planes a space extending about the flange within which a leader may be spirally coiled wholly in a plane parallel with and lying between the first and second-named planes, the ears of the second series alternating circumferentially of the spool with the ears of the first series, juxtaposed ears of the first and second series defining therebetween radial slots through which the leader may be threaded with its several spiraling convolutions confined in said space wholly in the third-named plane by the ears of the respective series, the inner ends of the slots terminating at said outer periphery of the flange.

References Cited in the file of this patent
UNITED STATES PATENTS

| | | |
|---|---|---|
| 395,178 | Scelles | Dec. 25, 1888 |
| 456,671 | Keats | July 28, 1891 |
| 2,247,881 | Hatfield | July 1, 1941 |
| 2,463,009 | Woodland et al. | Mar. 1, 1949 |

FOREIGN PATENTS

| | | |
|---|---|---|
| 346,394 | France | Nov. 24, 1904 |